United States Patent
Gochman et al.

(10) Patent No.: US 6,920,546 B2
(45) Date of Patent: Jul. 19, 2005

(54) FUSION OF PROCESSOR MICRO-OPERATIONS

(75) Inventors: Simcha Gochman, Haifa (IL); Ittai Anati, Haifa (IL); Zeev Sperber, Zichron Yaakov (IL); Robert Valentine, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 10/217,033

(22) Filed: Aug. 13, 2002

(65) Prior Publication Data

US 2004/0034757 A1 Feb. 19, 2004

(51) Int. Cl.[7] ............................................. G06F 9/30
(52) U.S. Cl. ................................................... 712/208
(58) Field of Search ............................ 712/208, 209, 712/210; 711/155

(56) References Cited

U.S. PATENT DOCUMENTS

| | | |
|---|---|---|
| 5,860,154 A | 1/1999 | Abramson et al. |
| 6,041,403 A | 3/2000 | Parker et al. |
| 6,675,376 B2 * | 1/2004 | Ronen et al. ............... 717/151 |
| 2003/0236967 A1 * | 12/2003 | Samra et al. ............... 712/210 |

OTHER PUBLICATIONS

The P6 Architecture: Background Information for Developers, Copyright 1995, Intel Corporation.

Jagannath Keshava and Vladimir Pentkovski: Microprocessor Products Group, Intel Corp., "Pentium® III Processor Implementation Tradeoffs", Intel Technology Journal Q2, 1999.

"Intel's P6 chip architecture not dead yet," by Michael Kanellos, Staff Writer, CNET News.com, Oct. 15, 2001, 1:00 PM PT.

* cited by examiner

Primary Examiner—Hiep T. Nguyen
(74) Attorney, Agent, or Firm—B. Delano Jordan (57) ABSTRACT

Methods and systems provide for the fusing of multiple operations into a single micro-operation (uop). A method of decoding a macro-instruction provides for transferring data relating to a first operation from the macro-instruction to a uop. The uop is to be executed by an execution system of a processor. The method further provides for transferring data relating to a second operation from the macro-instruction to the uop.

39 Claims, 8 Drawing Sheets

FUSION OF PROCESSOR MICRO-OPERATIONS

BACKGROUND

1. Technical Field

Embodiments of the present invention generally relate to computer processors. More particularly, embodiments relate to the fusing of multiple operations into a single micro-operation.

2. Discussion

Computers have become an integral part of modern society, and the demand for more functionality, lower costs and greater efficiency continues to grow. In order for computers to continue to meet the needs of the marketplace, a number of software as well as hardware issues must be addressed. For example, compiling programs into low-level macro-instructions, decoding the macro-instructions into even lower-level micro-operations (uops), reassigning logical registers to physical registers based on the uops, processing the uops, and retiring the uops after execution are but a small sampling of the processes that must be considered when improving computer efficiency.

Figure 1:
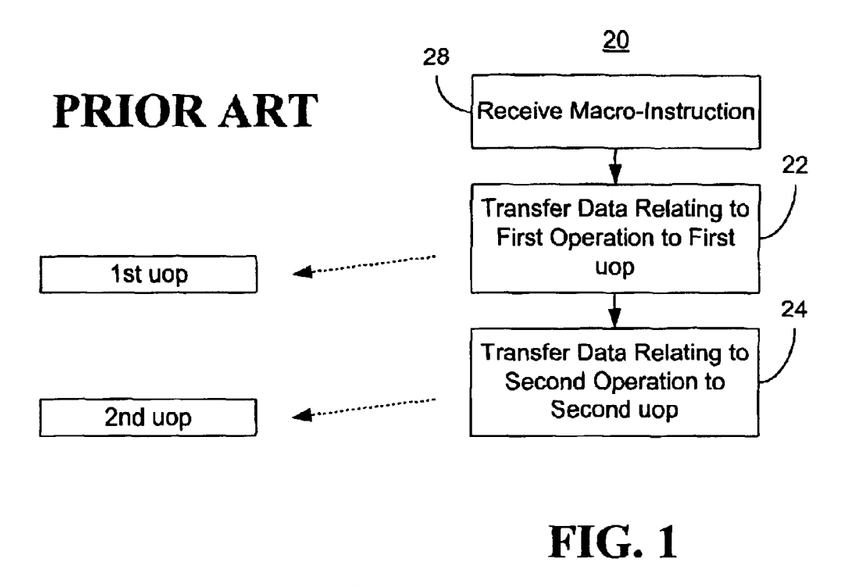
FIG. 1 is a flowchart of an example of a conventional approach to decoding a macro-instruction.

A conventional uop has one operational code (opcode) field and two source fields. The opcode field specifies the operation to be performed and the source fields provide the data to be used in the operation. Traditional approaches to decoding macro-instructions such as method 20 shown in FIG. 1, involve transferring data relating to a first operation from the macro-instruction to a first uop at processing block 22. Data relating to a second operation is transferred from the macro-instruction to a second uop at block 24. Thus, a single macro-instruction is often broken into multiple uops.

For example, a typical read-modify (or load-op) macro-instruction involves the first operation of reading a first operand from a particular address in memory, and the second operation of generating a final result based on the first operand and a second operand. Thus, the first uop is dedicated to the read operation and the second uop is dedicated to the modify operation. The opcode field of the first uop receives the appropriate opcode for the read operation, and the source fields receive the address data that specifies the memory location of the first operand. As will be discussed below, address data typically includes an address index, which incorporates a scaling factor, an address base and an address displacement. One approach to specifying memory addresses is discussed in U.S. Pat. No. 5,860,154 to Abramson, et al., although other approaches may also be used. The opcode field of the second uop receives the appropriate opcode for the modify operation, and the source fields receive the first operand (resulting from execution of the first uop) and the second operand. It should be noted that since the first operand results from execution of the first uop, one of the source fields in the second uop is left blank at the decoder stage. The first operand is typically copied from the memory location to the second uop at the reservation station stage of the pipeline (discussed below).

When the macro-instruction implements the storage of data, the first operation is to calculate the address of the store, and the second operation is to store the data to the calculated address. Thus, the first uop is dedicated to the address calculation operation and the second uop is dedicated to the data storage operation. The opcode field of the first uop receives the appropriate opcode for the address calculation operation, and the source fields receive the address data that specifies the destination memory location of the store. The opcode field of the second uop receives the appropriate opcode for the data storage operation, and the source fields receive the first operand (resulting from execution of the first uop) and the second operand (representing the data to be stored). Unlike the case of the read-modify macro-instruction, both uops may have all the necessary values at the decoder stage.

One reason for breaking instructions into two uops has been the limited number of source fields available in traditional uops. For example, in a read-modify instruction two source fields are needed for the address data, and two source fields are needed for the operands. Since conventional uops only have two source fields, two uops have been required to implement the entire macro-instruction. A more important reason for breaking instructions into two uops has been the desire to reduce latencies through out-of-order execution. Under this well documented approach, uops are executed when all of the necessary dependencies are resolved (and the execution resources are available) instead of in the order in which they are encountered. Unfortunately, there are a number of instructions, such as read-modify, with atomic operations that are inherently serial. In other words, the second operation cannot start until the first operation has completed. As a result, the benefits of out-of-order execution are lost with regard to certain instructions. Furthermore, the use of more uops than necessary reduces the number of instructions that can be executed in a clock cycle. There is therefore a need to improve efficiency and performance with regard to processor macro-instructions that have inherently serial operations. In the store case, there is a need to separate between the data and the address in order to resolve the store-address operation such that future memory accesses will not be delayed. The memory order buffer (MOB) enforces serial accesses to the memory due to unresolved store addresses (i.e., loads can't bypass stores to the same address). This serialization of future loads is performed based on the physical addresses of the cycles. If the address is not ready, all subsequent memory operations are held until the address is resolved. As it turns out, in most cases the operands for the address calculation are ready much earlier than the data of the store. In other words, the address is often a pointer to an element in a table, while the data is a result of a complex calculation. By breaking the store operation into two uops the store-address operation is able to dispatch earlier, resolve all address conflicts and open the memory pipeline for other loads (in which any delay greatly effects performance).

BRIEF DESCRIPTION OF THE DRAWINGS

The various advantages of embodiments of the present invention will become apparent to one skilled in the art by reading the following specification and appended claims, and by referencing the following drawings, in which:

DETAILED DESCRIPTION

Figure 2:
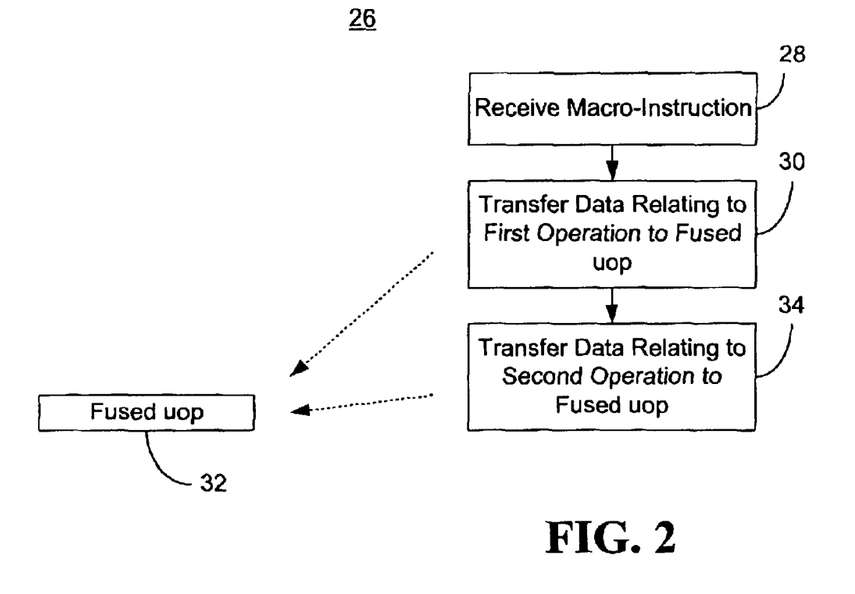
FIG. 2 is a flowchart of an example of a method of decoding a macro-instruction in accordance with one embodiment of the invention.

Embodiments of the invention provide for the construction and processing of fused micro-operations (uops) and enable significant efficiency and performance improvements. FIG. 2 shows a method 26 of decoding a macro-instruction according to one embodiment. While the method 26 will be primarily described with regard to macro-instructions such as read-modify instructions and store instructions that have inherently serial atomic operations, it will be appreciated that the embodiments of the invention are not so limited. Indeed, the method 26 can be useful for any instruction in which processing efficiency is an issue of concern. Notwithstanding, there are a number of aspects of read-modify and store instructions for which method 26 is uniquely suited.

It can be seen that the macro-instruction is received at processing block 28 and data relating to a first operation is transferred from the macro-instruction to a fused uop 32 at processing block 30. It can further be seen that block 34 provides for transferring data relating to a second operation from the macro-instruction to the fused uop 32.

Figure 3:
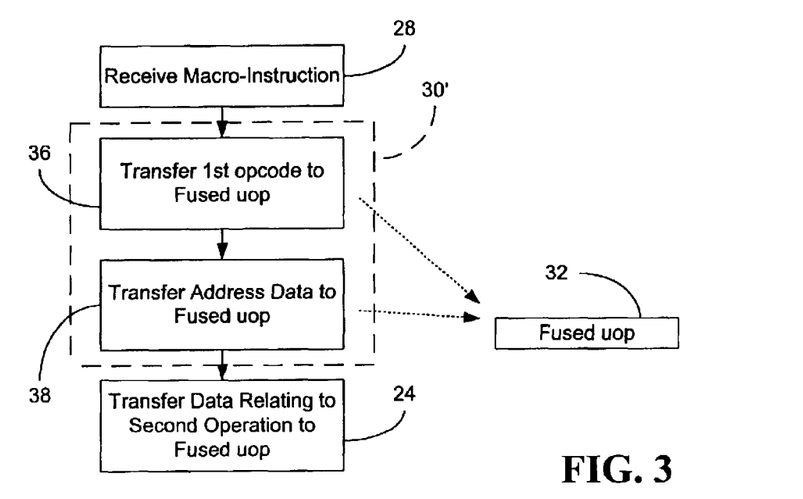
FIG. 3 is a flowchart of an example of a process of transferring data relating to a first operation to a fused micro-operation in accordance with one embodiment of the invention.

Turning now to FIG. 3, one approach to transferring data relating to the first operation is shown in greater detail at block 30'. Specifically, a first operational code (opcode) is transferred to the fused uop 32 at block 36. It can further be seen that block 38 provides for transferring address data from the macro-instruction to the fused uop 32, where the address data defines an address. In stores, the first uop is store data and the second uop receives the address related data.

Figure 4:
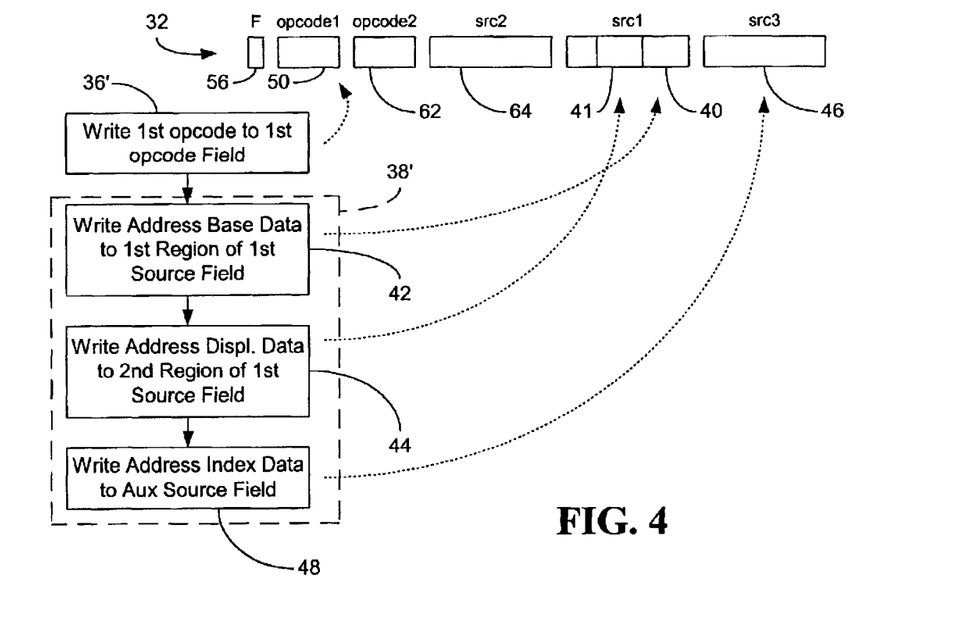
FIG. 4 is a flowchart of an example of a process of transferring address data to a fused micro-operation in accordance with one embodiment of the invention.

FIG. 4 shows one approach to constructing the fused uop 32 in greater detail. Specifically, 32-bit address base data is written to a first region 40 of a first source field (SRC1) at block 42. Block 44 provides for writing 32-bit address displacement data to a second region 46 of the first source field. It can further be seen that 32-bit address index data is written to a third source field 46 (SRC3) at block 48. It will be appreciated that traditional, non-fused uops do not contain the third source field 46. It should be noted that processing block 36' provides for writing the first opcode to a first opcode field 50 (opcode1).

Figure 5:
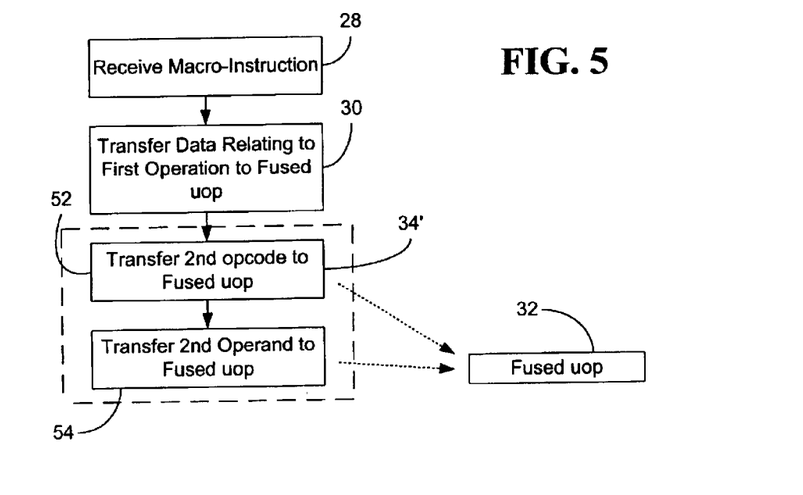
FIG. 5 is a flowchart of an example of a process of transferring data relating to a second operation to a fused micro-operation in accordance with one embodiment of the invention.

Turning now to FIG. 5, one approach to transferring data relating to the second operation to the fused uop 32 is shown in greater detail at processing block 34'. Specifically, a second opcode is transferred to the fused uop 32 at block 52, and a second operand is transferred to the fused uop 32 at block 54. Operands are transferred only if valid. Otherwise, data is received when its execution occurs.

Figure 6:
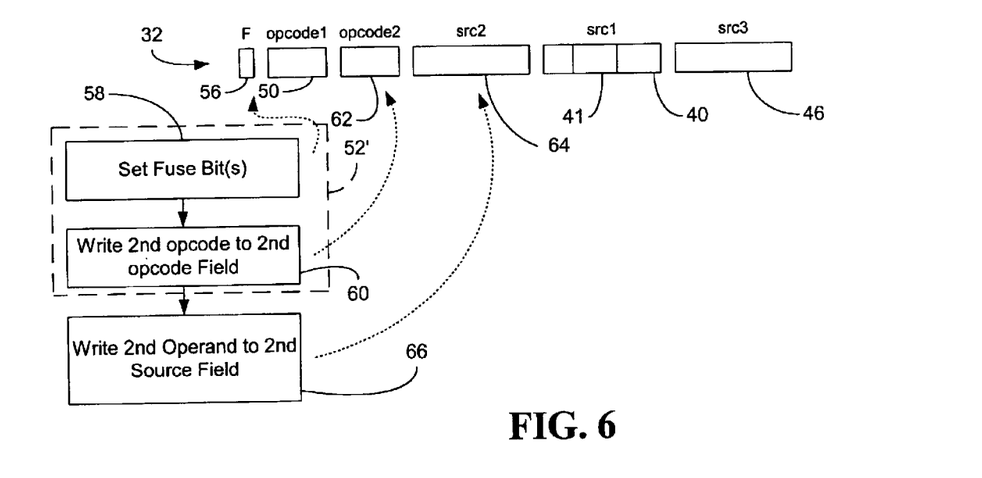
FIG. 6 is a flowchart of an example of a process of transferring a second operational code and a second operand to a fused micro-operation in accordance with one embodiment of the invention.

FIG. 6 demonstrates one approach to constructing the fused uop 32 in greater detail. Specifically, it can be seen that block 52' provides for setting a fuse bit 56 (F) at block 58, where the fuse bit 56 indicates that the uop 32 includes two operations. In this regard, it will be appreciated that all macro-instructions need not be decoded into fused uops. In other words, certain macro-instructions, such as read-modify and store instructions, be selected from the overall set of instructions as being good candidates for fusion. Thus, the fuse bit 56 (or bits) can be used to selectively enhance the efficiency of the pipeline in the decoding stages, dispatching stages, as well as the retirement stages. The second opcode is written to a second opcode field 62 at block 60. It can further be seen that the second operand is written to the second source field 64 (SRC2) at block 66. It will be appreciated that conventional uops only have one opcode field.

Figure 10:
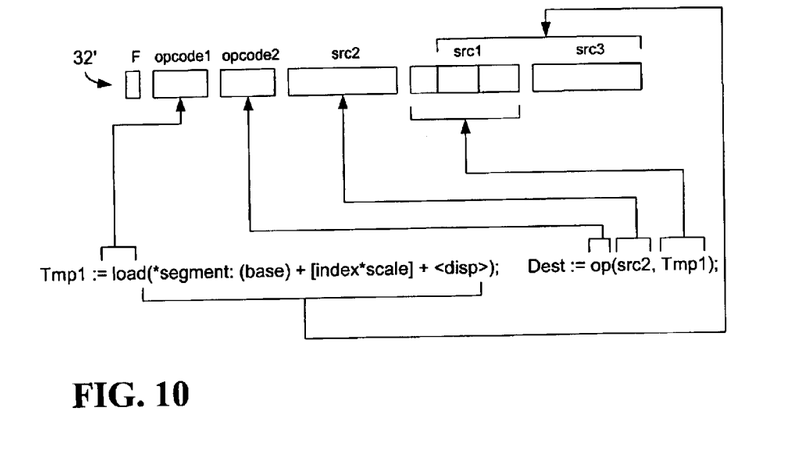
FIG. 10 is a block diagram of a fused micro-operation implementing a read-modify instruction in accordance with one embodiment of the invention.
Figure 11:
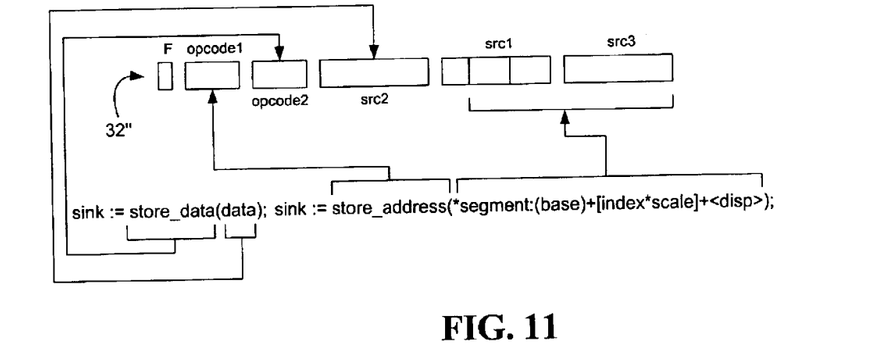
FIG. 11 is a block diagram of an example of a micro-operation implementing a store instruction in accordance with an alternative embodiment of the invention.

Turning now to FIGS. 10 and 11, the above-described uop construction is shown for read-modify instructions and store instructions, respectively. With regard to fused uop 32', it will be appreciated that read-modify instructions typically operate on data from memory. Examples of such instructions are:

add eax, dword ptr data;

or ecx, fs: byte ptr {edi};

As already discussed, traditional read-modify instructions can be viewed as implementing two atomic operations. A read operation loads a first operand from memory and stores it in a temporary register. The modify operation generates a final result based on the first operand in the temporary register and the second operand. Thus, a typical read-modify (or load-op) macro-instruction could be defined as follows:

Tmp1:=load (*segment: (base)+[index*scale]+<disp>);

Dest:=op (src2, Tmp1);

FIG. 10 demonstrates that the load opcode is written into the opcode1 field and the address data is distributed across the SRC1 and SRC3 fields. The modify opcode, which could be add, or, etc., is written to the opcode2 field. The SRC2 field receives the second operand, and the SRC1 field receives the first operand, which is obtained from the load operation. It is important to note that part of the address data is overwritten with the value of the first operand following the execution of the read from memory.

As also discussed above, traditional store operations can be viewed as implementing two atomic operations. An address calculation operation calculates the address of the store, where the calculated address constitutes the first operand, and a data storage operation stores the data (represented by the second operand) to the calculated address. Thus, a typical store macro-instruction could be defined as follows:

sink:=store_data(data);

sink:=store_address(*segment: (base)+[index*scale]+<disp>)

A "sink" in uCode (micro-code) means that neither a general purpose nor a temporary register was assigned for the operation in question. The results of the sink are the operation flags (if the operation produces flags) and the exceptions/faults. In the store operation, the pDest (physical register destination address—the address associated with a ReOrder Buffer entry) is associated with an entry to the store buffer allocated by the allocation module. This value is used to correlate between the store address operation and the store data operation.

As shown in the fused uop 32" of FIG. 11, when the macro-instruction stores data, the first opcode defines an address calculation operation, where the address calculation operation directs an address generation unit of the execution system to calculate the address defined by the address data. The opcode, "store-address", for this address calculation operation is stored in the opcode1 field, and the associated address data is distributed across the SRC1 and SRC3 fields. It can further be seen that the second opcode, "store_data", defines a store data operation, where the store data operation directs an address generation unit of the execution system to store the second operand to the address resulting from the first operation. The store data operation is therefore written to the opcode2 field, and the data is written to the SRC2 field. It will be appreciated that other instructions may also be used to construct fused uops. The specific examples shown are therefore used to facilitate discussion only.

Figure 7:
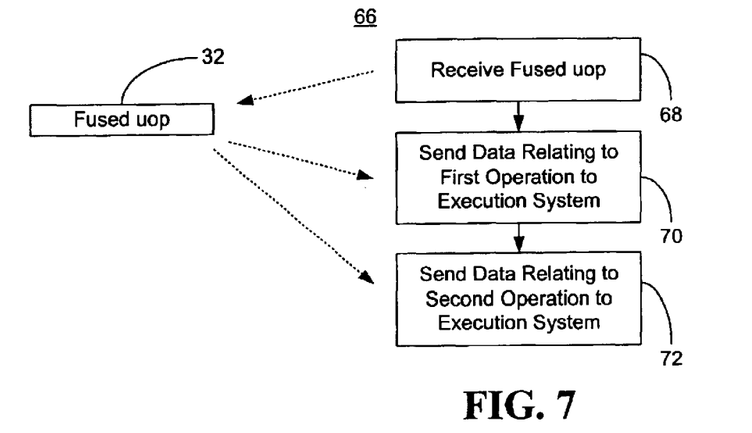
FIG. 7 is a flowchart of an example of a method of processing a fused micro-operation in accordance with one embodiment of the invention.

Turning now to FIG. 7, a method 66 of processing a fused uop 32 is shown. It can be seen that the fused uop 32 is received at block 68, and data relating to a first operation is sent to an execution system of a processor at block 70, where the execution system generates a first operand based on the data relating to the first operation. Processing block 72 provides for sending data relating to a second operation to the execution system upon receipt of the first operand. As already discussed, the fused uop 32 includes the data relating to the first operation and the data relating to the second operation. Data related to the second operand is partially stored in the reservation station (RS) entry and partially received following the execution of the first operation in the fused uop.

Figure 8:
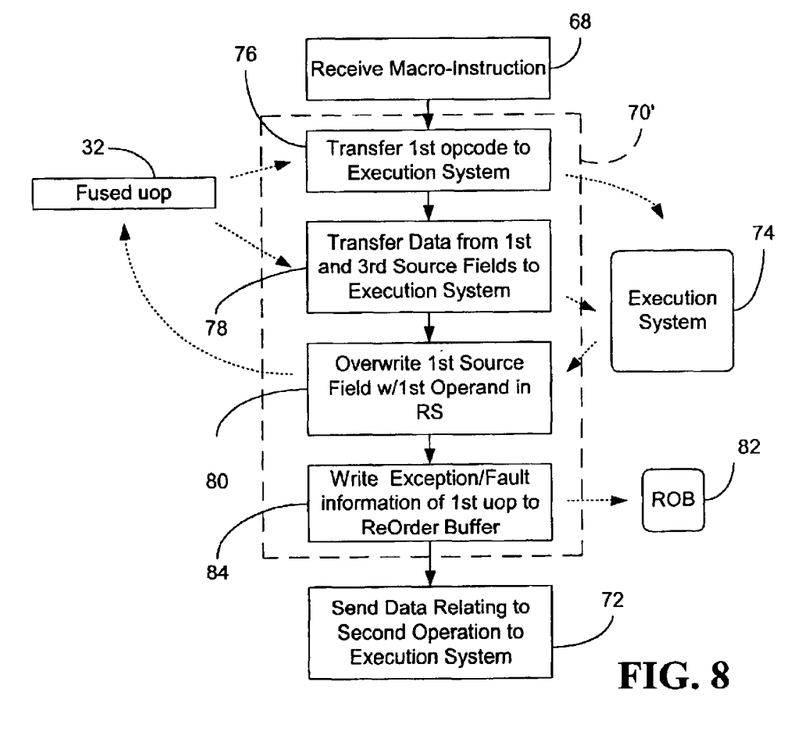
FIG. 8 is a flowchart of an example of a process of sending data relating to a first operation to an execution system in accordance with one embodiment of the invention.

FIG. 8 shows one approach to sending data relating to the first operation to the execution system 74 in greater detail at 70'. Specifically, it can be seen that the first opcode is transferred from the fused uop 32 to the execution system 74 at block 76. Processing block 78 provides for transferring address data from the fused uop 32 to the execution system 74, where the address data defines an address. The address data in the fused uop 32 is overwritten at block 80 with the first operand obtained from the execution system 74. The returned data from the first operation of the fused uop is not written to any of the RS entries that are dependent on the fused uop result. The data for these uops is written only when the second operation of the fused uop is executed. This is obtained by adding one bit to the pDest to distinguish between the result of the first and second operation. The additional bit is sent to the execution system and received back with the pDest value. The exception and fault data of the first operation is written into the ReOrder Buffer (ROB) at block 84. This allows efficient handling of exceptions for fused uops.

Figure 9:
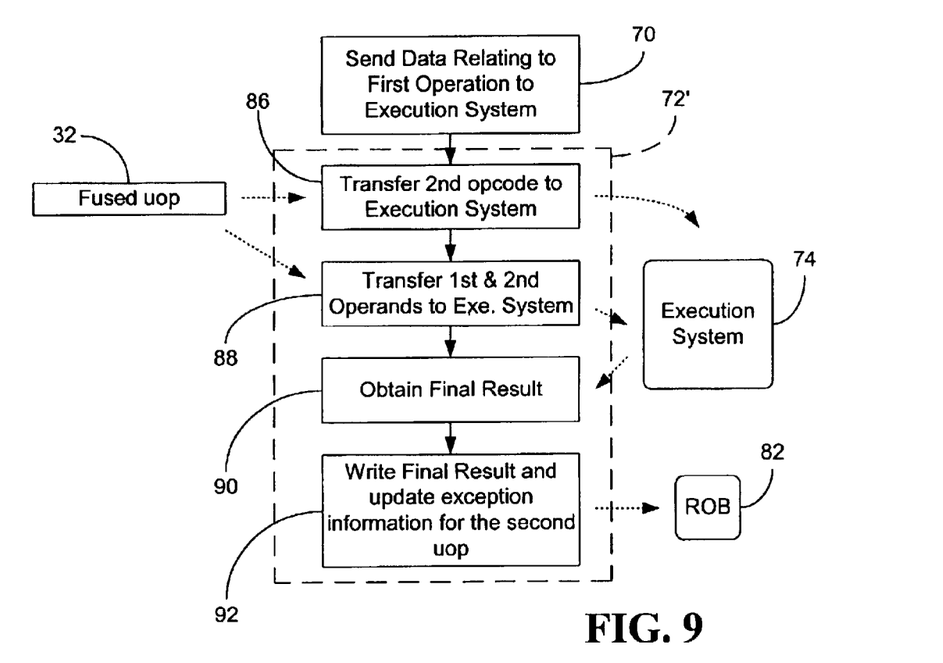
FIG. 9 is a flowchart of an example of a process of sending data relating to a second operation to an execution system in accordance with one embodiment of the invention.

Turning now to FIG. 9, one approach to sending data relating to the second operation to the execution system 74 is shown in greater detail at block 72'. Specifically, processing block 86 provides for transferring the second opcode from the fused uop 32 to the execution system 74, where the second opcode defines the second operation. It can further be seen that the second operand and the first operand are transferred from the fused uop 32 to the execution system 74 at block 88. As will be discussed in greater detail below, the operands are distributed to the appropriate execution units within the execution system 74. A final result of the second operation is obtained from the execution system 74 at processing block 90. It can be seen that at block 92, data is written into the ROB 82 with the final result, and the exception/fault data is saved in a dedicated location for the second operation.

Figure 12:
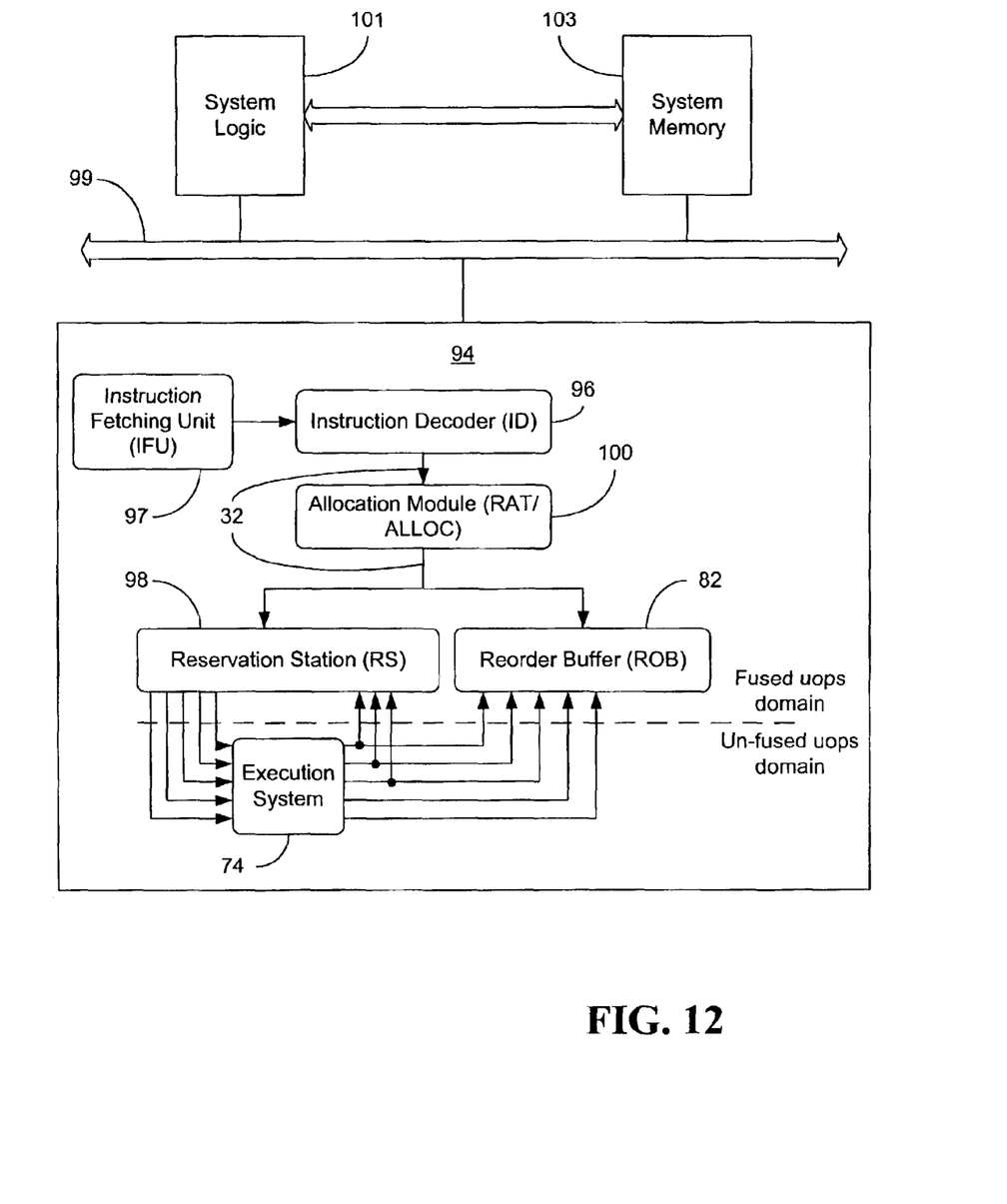
FIG. 12 is a block diagram of an example of a microprocessor in accordance with one embodiment of the invention.

FIG. 12 shows an architecture including a microprocessor 94 that can be used to implement the approaches discussed above. Generally, a first stage of an instruction fetching unit (IFU) 97 performs a read of the instruction cache (not shown) or may read from a processor bus 99, which may communicate with system logic 101 and/or system memory 103 according to well-documented approaches. The data read is passed on to a second stage of the IFU 97—the instruction length decoder. This stage marks the beginning an end of each instruction and passes data on to two places. The first destination is the branch target buffer (BTB, not shown), where a target address lookup is performed. If a valid target is found, a new IFU address is presented to the first stage and the new code fetched. The second destination is the third stage of the IFU 97. This is the instruction rotation stage, where instructions are rotated to align exactly with their respective decoder units.

In addition, the microprocessor 94 has an execution system 74, an instruction decoder 96 (ID), and a reservation station 98 (RS). The ID 96 has two simple decoders and one complex decoder, and generates one or more fused uops 32 based on the macro-instruction obtained from the IFU 97. It is important to note that the fused uops 32 enable the ID 96 to decode more instructions per clock cycle. The reservation station 98 dispatches the fused uops 32 to the execution system 74. It can be seen that upon dispatch, the uops are un-fused and are sent to the appropriate execution unit within the execution system 74. The illustrated execution system 74 can operate in accordance with the well-documented Intel P6 architecture and may have two ports that occupy floating point units (FPU), two integer units, and several FP and non-FP single instruction/multiple data (SIMD) execution units (EUs), two ports that occupy two address generation units (AGUs) for load/store operations, and one port for the store data. Thus, the execution system 74 can be viewed as having five input ports and five output ports. To simplify processing, all entries of the reservation station 98 are identical and can hold any type of uop. The illustrated reservation station 98 has 24 entries. Dispatching is determined by checking the validity of the operation sources and determining whether an execution unit for this type of operation is available. The data received from ports 0, 1 and 2 (EU ports and the memory load data port) is written into any RS entries that are dependent on them.

It can further be seen that an allocation module 100 is disposed between the ID 96 and the RS 98. The allocation module 100 assigns physical registers to the uops based on a register alias table (RAT). As already discussed, the ROB 82 stores the results of the second operations and the exception/fault information of both operations. By combining two uops into one during the front-end and out-of-order (or RS) stages of the uop, the machine is effectively widened. The front-end appears to be wider because more instructions are able to pass through. The out-of-order stage appears to be wider because the same array size now holds more instructions. The retirement stages are wider because more instructions are able to retire in a clock cycle. The execution system, however, is unaffected by the fusion. This is accomplished by "un-fusing" the fused uop 32 and separately dispatching the operations to the appropriate execution unit(s). The results are merged back together in the ROB 82 by using a single register entry.

It will be appreciated that problems can result from the fact that there is the possibility of an exception occurring on either of two independent uops resulting from a fused uop. Retirement is the act of committing the results of an operation to an architectural state. For the load-op case, the retirement is done when both uops are in. For the store case, if the store data uop returns with exception, retirement can start. Furthermore, the exception of the first uop has precedence over the second uop, and non-execution related faults (such as a floating point stack overflow detected in the front end) have precedence over the exceptions from the uops.

Figure 13:
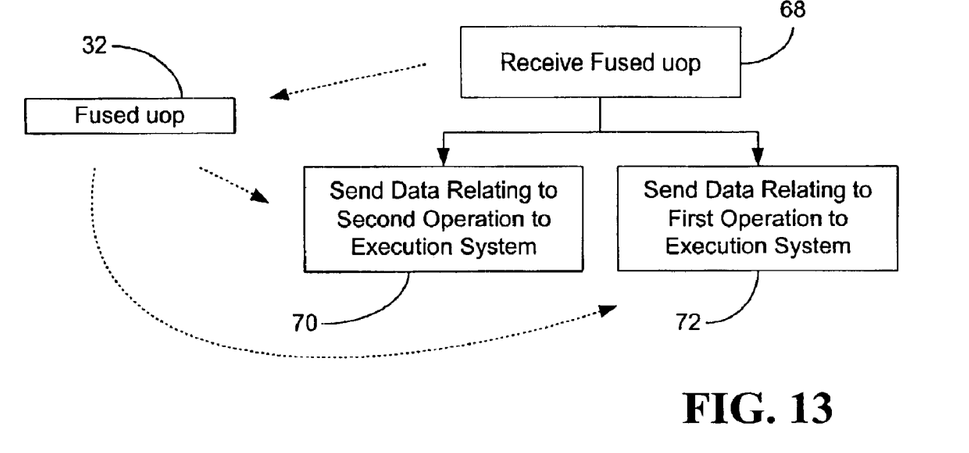
FIGS. 13 and 14 are flowcharts of an example of parallel processing of a store operation in accordance with one embodiment of the invention.
Figure 14:
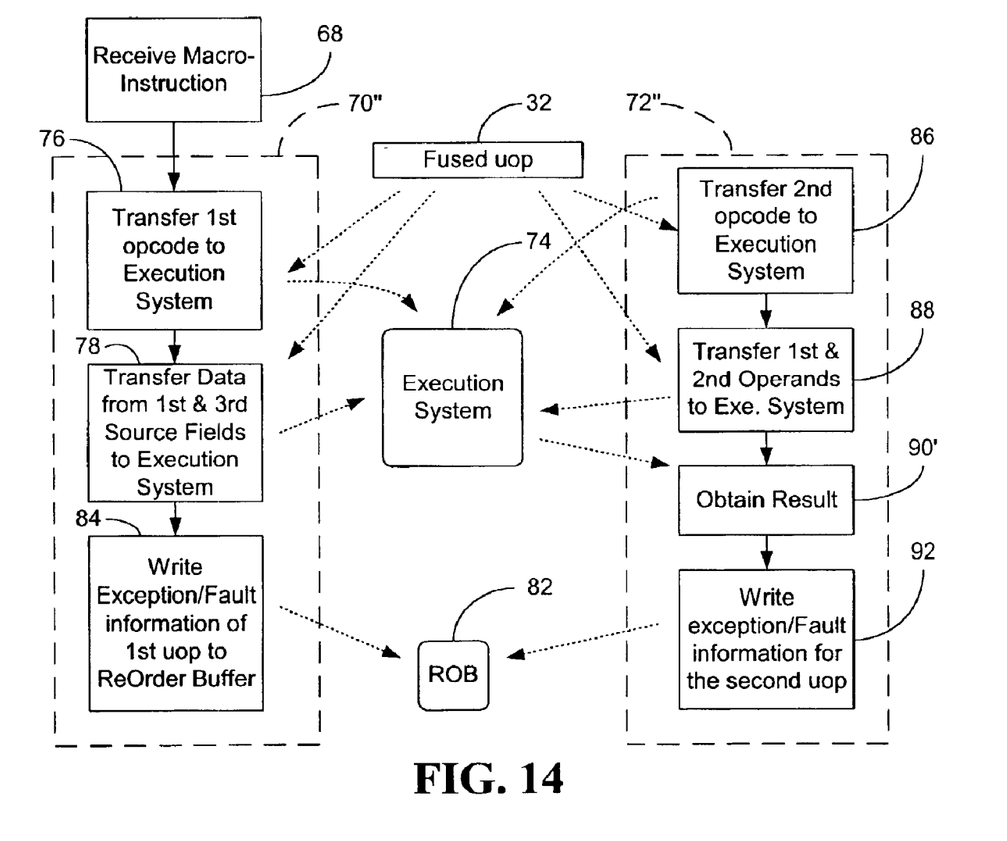

Turning now to FIGS. 13 and 14, it can be seen that in the case of the store operation, the two uops making up the fused uop 32 can be issued to the execution system 74 in parallel. Specifically, block 74" provides for sending data relating to the store address operation to the execution system 74, while block 72" provides for sending data relating to the store data operation to the execution system 74.

Thus, fusion can occur for dependent operations as well as independent operations. Dispatch can be done for the first operation, while dispatch of the second operation can wait for the result. Alternatively, dispatch can be implemented independently. Furthermore, operations can be dispatched to two of the same ports or different ports, where port assignment is done in the allocation module.

Retirement can be done when both operations arrive, or when the first operation arrives with an exception. The ROB/RS is notified whether the retirement data results from the first operation or the second operation, and the ROB only writes the data of the second operation. In addition, the ROB directs the exceptions to different fields of the fused uop entry. In this example, the RS does not propagate the retirement data of the first operation to other RS entries dependent upon that operation, and writes it to that operation if needed. Furthermore, the RS propagates the retirement data of the second operation to other RS entries depending upon the pDest value. The ROB maintains exception priorities between the first and second operations, and maintains priorities between architectural exceptions produced by the allocation module versus architectural exceptions produced by the front end.

The fused uops use three sources and can overwrite sources with data of the first operation. Special care is taken to avoid overwriting source data when the first operation is canceled. It should also be noted that fusion can be implemented for modify-modify (or op—op) instructions that have related operations. For example, the instruction:

tmp:=op1 (Gp1, Gp2);
Gp1:=op2 (tmp, Gp3)

could be subjected to fusion. It can be seen that the above operations also use three sources. Furthermore, the operations can use the same or different ports and can be issued one after the other as in the case of read-modify instructions. A new port assignment per port may be needed in the general case.

By enabling complex uops to be represented in one fused uop, the uops can be decoded by all decoders. This allows twice as many uops to be allocated and retired, and enables an increase in the effective size of the ROB 82 and RS 98 without adding new entries. The performance increase due to read-modify fusion is approximately 1–2% in integer code. The performance increase due to single store uop fusion is approximately 4–5% in integer code and approximately 4% in floating point code.

Those skilled in the art can now appreciate from the foregoing description that the broad techniques of the embodiments of the present invention can be implemented in a variety of forms. Therefore, while the embodiments have been described in connection with particular examples thereof, the true scope of the embodiments of the invention should not be so limited since other modifications will become apparent to the skilled practitioner upon a study of the drawings, specification, and following claims.

What is claimed is:

1. A method of decoding a macro-instruction, the method comprising:
   transferring data relating to a first operation from the macro-instruction to a micro-operation having a plurality of operational code fields, the micro-operations to be executed by an execution system of a processor; and
   transferring data relating to a second operation from the macro-instruction to the micro-operation.

2. The method of claim 1 further including:
   transferring a first operational code (opcode) from the macro-instruction to the micro-operation, the first opcode defining the first operation; and
   transferring address data from the macro-instruction to the micro-operation, the address data defining an address.

3. The method of claim 2 wherein the first opcode defines a read operation, the read operation to direct an address generation unit of the execution system to read a first operand from the address defined by the address data.

4. The method of claim 2 wherein the first opcode defines an address calculation operation, the address calculation operation to direct an address generation unit of the execution system to calculate the address defined by the address data.

5. The method of claim 2 further including:
   writing address base data and address displacement data to a first source field of the micro-operation; and
   writing address index data to a third source field of the micro-operation.

6. The method of claim 2 further including writing the first opcode to a first opcode field of the micro-operation.

7. The method of claim 1 further including:
   transferring a second operational code (opcode) from the macro-instruction to the micro-operation, the second opcode defining the second operation; and
   transferring a second operand from the macro-instruction to the micro-operation, the second operand corresponding to the second opcode.

8. The method of claim 7 wherein the second opcode defines a modify operation, the modify operation to direct one of an integer unit and a floating point unit of the execution system to modify data resulting from the first operation based on the second operand.

9. The method of claim 7 wherein the second opcode defines a store operation, the store operation to direct an address generation unit of the execution system to store the second operand to an address resulting from the first operation.

10. The method of claim 7 further including writing the second operand to a second source field of the micro-operation.

11. The method of claim 7 further including writing the second opcode to a second opcode field of the micro-operation.

12. The method of claim 1 further including setting a fuse bit in the micro-operation, the fuse bit to indicate that the micro-operation includes two operations.

13. A method of processing a fused micro-operation, the method comprising:

receiving the micro-operation;

sending data relating to a first operation to an execution system of a processor, the execution system to generate a first operand; and sending data relating to a second operation to the execution system upon receipt of the first operand, the micro-operation including a plurality of operational code fields, and the data relating to the first operation and the data relating to the second operation.

14. The method of claim 13 further including:

transferring a first operational code (opcode) from a first opcode field of the micro-operation to the execution system;

transferring data from a first source field and a third source field of the micro-operation to the execution system, and overwriting the data in the first source field of the micro-operation with the first operand.

15. The method of claim 14 further including writing exception information associated with the first operand to a reorder buffer of the processor.

16. The method of claim 14 wherein the first opcode defines a read operation, the read operation to direct an address generation unit of the execution system to read the first operand from an address defined by the data.

17. The method of claim 14 wherein the first opcode defines an address calculation operation, the address calculation operation to direct an address generation unit of the execution system to calculate an address defined by the data, the first operand including the calculated address.

18. The method of claim 14 wherein the first opcode defines a modifying operation, the modifying operation to direct one of an integer unit and a floating point unit of the execution system to operate on the data in the first source field and the third source field.

19. The method of claim 13 further including:

transferring a second operational code (opcode) from a second opcode field of the micro-operation to the execution system, the second opcode defining the second operation; and transferring a second operand from a second source field of the micro-operation and the first operand from a first source field of the micro-operation to the execution system.

20. The method of claim 19 further including:

obtaining a final result of the second operation from the execution system; and writing exception information associated with the final result to a reorder buffer of the processor.

21. The method of claim 19 wherein the second opcode defines a modify operation, the modify operation to direct one of an integer unit and a floating point unit of the execution system to operate on the first operand and the second operand.

22. The method of claim 19 wherein the second opcode defines a store operation, the store operation to direct an address generation unit of the execution system to store the second operand to an address corresponding to the first operand.

23. A method of decoding a macro-instruction having data relating to a first operation and data relating to a second operation, the method comprising:

transferring a first operational code (opcode) from the macro-instruction to a micro-operation, the first opcode defining the first operation, the micro-operation to be executed by an execution system of a processor;

writing address base data to a first region of a first source field of the micro-operation;

writing address displacement data to a second region of the first source field;

writing address index data to a third source field of the micro-operation;

transferring a second opcode from the macro-instruction to the micro-operation;

writing a second operand to a second source field of the micro-operation; and setting a fuse bit in the micro-operation, the fuse bit to indicate that the micro-operation includes two operations.

24. The method of claim 23 wherein the first opcode defines a read operation and the second opcode defines a modify operation, the read operation to direct the execution system to read a first operand from an address defined by the base data, the displacement data, and the index data, the modify operation to direct the execution system to modify the second operand based on the first operand.

25. The method of claim 23 wherein the first opcode defines an address calculation operation and the second opcode defines a store operation, the address calculation operation to direct the execution system to calculate an address defined by the base data, the displacement data, and the index data, the store operation to direct the execution system to store the second operand data to the calculated address.

26. A microprocessor comprising:

an execution system;

an instruction decoder to generate a fused micro-operation based on a macro-instruction; and a reservation station to dispatch the micro-operation to the execution system, the micro-operation having plurality of operational code fields, data relating to a first operation and data relating to a second operation.

27. The microprocessor of claim 26 further including an allocation module coupled to the instruction decoder and the reservation station, the allocation module to assign physical registers to the first and the second operation base on a register alias table (RAT).

28. The microprocessor of claim 26 further including a reorder buffer, the reorder buffer to store results of the first operation and the second operation.

29. The microprocessor of claim 26 further including an instruction fetching unit to retrieve the macro-instruction.

30. An architecture comprising:

a system memory;

a processor bus coupled to the system memory; and a processor coupled to the bus, the processor including an execution system, an instruction decoder to generate a fused micro-operation based on a macro-instruction, and a reservation station to dispatch the micro-operation to the execution system, the micro-operation having a plurality of operational code fields, data relaxing to a first operation and data relating to a second operation.

31. The architecture of claim 30 wherein the processor further includes an allocation module coupled to the instruction decoder and the reservation station, the allocation module to assign physical registers to the first and the second operation based on a register alias table (RAT).

32. The architecture of claim 30 wherein the processor further includes a reorder buffer, the reorder buffer to store results of the first operation and the second operation.

33. The architecture of claim 30 wherein the processor further includes an instruction fetching unit to retrieve the macro-instruction from the bus.

34. A computer readable medium storing a set of instructions capable of being executed by a processor to:

transfer data relating to a first operation from a macro-instruction to a micro-operation having plurality of operational code fields, the micro-operation to be executed by an execution system of a processor; and transfer data relating to a second operation from the macro-instruction to the micro-operation.

35. The medium of claim 34 wherein the instructions are further capable of being executed to:

transfer a first operational code (opcode) from the macro-instruction to the micro-operation, the first opcode defining the first operation; and transfer address data from the macro-instruction to the micro-operation, the address data defining an address.

36. The medium of claim 34 wherein the instructions are further capable of being executed to:

transfer a second operational code (opcode) from the macro-instruction to the micro-operation, the second opcode defining the second operation; and transfer a second operand from the macro-instruction to the micro-operation, the second operand corresponding to the second opcode.

37. A computer readable medium storing a set of instructions capable of being executed by a processor to:

receive a fused micro-operation;

send data relating to a first operation to an execution system of a processor, the execution system to generate a first operand; and send data relating to a second operation to the execution system upon receipt of the first operand, the micro-operation including a plurality of operational code fields, the data relating to the first operation and the data relating to the second operation.

38. The medium of claim 37 wherein the instructions are further capable of being executed to:

transfer a first operational code (opcode) from a first opcode field of the micro-operation to the execution system; transfer data from a first source field and a third source field of the micro-operation to the execution system; and overwrite the data in the first source field of the micro-operation with the first operand.

39. The medium of claim 37 wherein the instructions are further capable of being executed to:

transfer a second operational code (opcode) from a second opcode field of the micro-operation to the execution system, the second opcode defining the second operation; and transfer a second operand from a second source field of the micro-operation and the first operand from the first source field of the micro-operation to the execution system.

* * * * *